US011638177B2

(12) United States Patent
Syed et al.

(10) Patent No.: US 11,638,177 B2
(45) Date of Patent: *Apr. 25, 2023

(54) PRIORITY ACCESS LICENSE HOLDER PROTECTION

(71) Applicant: Charter Communications Operating, LLC, St. Louis, MO (US)

(72) Inventors: Haider H. Syed, Parker, CO (US); Volkan Sevindik, Reston, VA (US); Perwaiz Akhtar, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/141,369

(22) Filed: Jan. 5, 2021

(65) Prior Publication Data
US 2021/0127304 A1 Apr. 29, 2021

Related U.S. Application Data

(63) Continuation of application No. 16/221,951, filed on Dec. 17, 2018, now Pat. No. 10,945,161.

(51) Int. Cl.
*H04W 28/20* (2009.01)
*H04W 24/10* (2009.01)
(Continued)

(52) U.S. Cl.
CPC ............ *H04W 28/20* (2013.01); *H04B 17/24* (2015.01); *H04B 17/27* (2015.01); *H04B 17/345* (2015.01);
(Continued)

(58) Field of Classification Search
CPC ..... H04W 28/20; H04W 16/18; H04W 24/10; H04W 64/006; H04W 72/082; H04B 17/24; H04B 17/27; H04B 17/345
See application file for complete search history.

(56) References Cited

U.S. PATENT DOCUMENTS 10,945,161 B2 * 3/2021 Syed .................. H04W 64/006
2010/0081441 A1 * 4/2010 Tao ..................... H04W 72/082
455/450

(Continued)

*Primary Examiner* — Kashif Siddiqui
(74) *Attorney, Agent, or Firm* — Armis IP Law, LLC

(57) ABSTRACT

According to one configuration, a communication management resource in a wireless network environment records a location of a wireless base station. The communication management resource then defines a region of wireless coverage provided by the wireless base station based on feedback received from the wireless base station. For example, in one arrangement, the user equipment provides performance metrics to the wireless base station. The wireless base station uses the performance metrics to determine boundaries associated with a region of wireless coverage provided by the wireless base station. The wireless base station communicates the boundary information to the communication management resource. Subsequent to identifying the location of the wireless base station and defining the determined region of wireless coverage associated with the wireless base station, the communication management resource then controls allocation of wireless bandwidth in a vicinity of the region of wireless coverage to protect the wireless base station from interference.

31 Claims, 10 Drawing Sheets

(51) Int. Cl.
  *H04W 72/08* (2009.01)
  *H04W 16/18* (2009.01)
  *H04B 17/345* (2015.01)
  *H04B 17/24* (2015.01)
  *H04B 17/27* (2015.01)
  *H04W 64/00* (2009.01)

(52) U.S. Cl.
  CPC ............ *H04W 16/18* (2013.01); *H04W 24/10* (2013.01); *H04W 64/006* (2013.01); *H04W 72/082* (2013.01)

(56) References Cited

U.S. PATENT DOCUMENTS

| | | | |
|---|---|---|---|
| 2012/0039191 A1* | 2/2012 | Foster | H04W 24/08 370/252 |
| 2014/0179332 A1* | 6/2014 | Qian | H04L 1/20 455/452.1 |
| 2015/0215893 A1* | 7/2015 | Litmanovich | H04W 16/18 455/456.3 |
| 2018/0270690 A1* | 9/2018 | Sundaresan | H04W 72/082 |
| 2019/0028182 A1* | 1/2019 | Smyth | H04W 24/08 |
| 2019/0327765 A1* | 10/2019 | Mukherjee | H04W 16/14 |
| 2020/0059962 A1* | 2/2020 | Tejedor | H04W 16/14 |

* cited by examiner

PAL SERVICE PROVIDER INFORMATION
161-1

WBS 131 ......ID = XXZ2..........L1 ..........SP #1

WBS 132 ......ID = XXZ3..........L2 ..........SP #1

WBS 133 ......ID = ABX6..........L3 ..........SP #2

...

CHANNEL ALLOCATION INFORMATION
162-1

ID = XXZ2 ..........S.P. #1 ........CH #11, #12

ID = XXZ3 ..........S.P. #1 ........CH #11, #12

ID = ABX6 ..........S.P. #2 ........CH #14

PAL SERVICE PROVIDER INFORMATION
161-2

WBS 131 .........L1 .....ROWC 631 (RADIUS #1).......SP #1
WBS 132 .........L2 .....ROWC 632 (RADIUS #2).......SP #1
WBS 133 .........L3..........................................SP #2

PRIORITY ACCESS LICENSE HOLDER PROTECTION

RELATED APPLICATION

This application is a continuation application of earlier filed U.S. patent application Ser. No. 16/221,951 entitled "PRIORITY ACCESS LICENSE HOLDER PROTECTION,", filed on Dec. 17, 2018, the entire teachings of which are incorporated herein by this reference.

BACKGROUND

Conventional wireless networks typically include one or more wireless base stations to provide mobile communication devices access to a remote network such as the Internet. One type of wireless base station is a so-called CBSD (Citizen Broadband Radio Service Device). Such a device uses a wireless channel allocated from a CBRS (Citizens Band Radio Service) band to support communications with one or more mobile communication devices.

Typically, so-called SAS (Spectrum Access Service) in a CBRS network allocates one or more wireless channels to a CBSD (such as a wireless base station) to support communications with respective user equipment such as one or more mobile communication devices. Each base station can be configured to communicate with the SAS to receive notification of the one or more wireless channels allocated for its use. Controlled allocation of wireless channels by the spectrum access system helps to prevent interference.

There are multiple different types of wireless channels in a conventional CBRS band. For example, portions of bandwidth in a CBRS band include so-called Priority Access License (PAL) wireless channels, General Authorized Access (GAA) wireless channels, or a combination of both.

In general, PAL wireless channels are licensed wireless channels in which a corresponding licensee (such as an entity paying for use of the wireless channel) is provided some protection of use. For example, when no incumbent user requires use of the channels, the licenses entity is able to freely use the PAL wireless channels in respective one or more predetermined geographical regions without interference by other users (such as lower priority GAA users).

Subsequent to allocation, the wireless base station then uses the allocated bandwidth to provide one or more communication devices access to a remote network such as the Internet.

BRIEF DESCRIPTION OF EMBODIMENTS

There are deficiencies associated with conventional techniques of determining regions of geographical coverage associated with licensed users and corresponding wireless channels.

For example, conventional techniques do not provide an accurate way of identifying an actual corresponding geographical region of protection to be afforded to licensed entities. The result is that either the PAL entity paying for use of respective licensed wireless channels may experience interference if the conventional determined region of protection provided by a spectrum access system is too small. Conversely, if the region of protection afforded by the spectrum access system to a licensed entity is too large, the available bandwidth is not used to its fullest potential.

Certain embodiments herein solve the problem of area (region of wireless coverage) determination in which priority spectrum license holders are protected. For example, the protected areas as described herein are called PAL protection areas (PPAs). Currently there is no specific method of creating an accurate PPA in a network environment. Embodiments herein propose a novel method to create PPAs (PAL protection areas) in a CBRS network based on any combination of UE measurements, CBSD location, and CBSD performance counters & KPIs.

Thus, embodiments herein provide novel ways of providing improved use of wireless channels amongst different entities sharing use of bandwidth in a wireless network environment.

More specifically, according to one example embodiment, a communication management resource tracks and records a location of a wireless base station in a network environment. The communication management resource defines a region of wireless coverage provided by the wireless base station based on input (feedback) received from the wireless base station. Subsequent to defining the location and region of wireless coverage associated with the wireless base station, the communication management resource (such as a spectrum access system) then controls allocation of wireless bandwidth in a vicinity of the region of wireless coverage.

In one embodiment, the controlled allocation of bandwidth by the communication management resource in the vicinity of the region of wireless coverage provided by the wireless base station protects use of wireless channels licensed to a respective service provider operating the wireless base station to provide wireless coverage to user equipment in the region of wireless coverage. For example, the controlled allocation of bandwidth in the vicinity of the region of wireless coverage provided by the wireless base station reduces wireless interference between the wireless base station and user equipment in communication with the wireless base station.

The input from the wireless base station can include any suitable information. For example, in one embodiment, the input is generated by the wireless base station based upon wireless link performance metrics provided by user equipment in communication with the wireless base station. The input provides an indication of the wireless coverage region provided by the corresponding wireless base station.

In accordance with still further embodiments, the licensed channels assigned to the wireless base station are wireless channels allocated from a CBRS (Citizen Band Radio Service) spectrum.

In accordance with further embodiments, defining the region of wireless coverage provided by the wireless base station based on the input received from the wireless base station includes: via the input, identifying a distance between the wireless base station and user equipment in wireless communication with the wireless base station. The identified distance provides an indication of a current region of wireless coverage associated with the wireless base station.

Further embodiments herein include defining and determining the region of wireless coverage provided by the wireless base station based at least in part on a level of wireless interference experienced by user equipment in communication with the wireless base station.

In yet further embodiments, the wireless base station provides the input in response to detecting that user equipment in communication with the wireless base station detects wireless interference associated with the wireless channels licensed to the wireless base station. Because the channels are licensed, the service provider paying for such licensed PAL wireless channels has an expectation of little or no wireless interference by GAA wireless channel users.

The user equipment communicates occurrence of the interference to the wireless base station. The wireless base station generates and/or stores metrics indicating occurrence of the interference in one or more communications to the communication management resource.

In yet further embodiments, tracking the location of the wireless base station includes: receiving location information from the wireless base station, the location information indicating the location of the wireless base station in the network environment; and providing a mapping between the location of the wireless base station and the wireless channels licensed to the wireless base station.

It is noted that use of unlicensed wireless channels in a vicinity of the wireless base station can cause wireless interference. According to further embodiments, controlling allocation of wireless bandwidth in the vicinity of the region of wireless coverage includes: controlling allocation of unlicensed wireless channels in the network environment in or around a vicinity of the wireless base station, the controlled allocation of the unlicensed wireless channels reducing interference with the licensed wireless channels.

In accordance with yet further embodiments, a wireless base station monitors user equipment in communication with the wireless base station. The wireless base station receives feedback from the user equipment; the feedback indicates link quality between the user equipment and the wireless base station. The wireless base station and/or other resource such as the communication management resource defines the region of wireless coverage provided by the wireless base station based on the feedback received from the user equipment. The communication management resource then controls allocation of wireless bandwidth in a vicinity of the region of wireless coverage; the controlled allocation protects use of wireless channels licensed to the wireless base station.

In one embodiment, the link quality for one or more client communication devices (user equipment) indicates a level of wireless interference above a threshold value. In response to detecting that the link quality is above the threshold value, the communication management resource calculates the distance between the wireless base station in the user equipment and then defines the region of wireless coverage based on the calculated distance.

In a similar manner as previously discussed, the licensed channels can be selected from any suitable available wireless spectrum. In one example embodiment, the wireless channels are allocated from a CBRS (Citizen Band Radio Service) spectrum.

In accordance with further embodiments, the allocation management resource grants the wireless base station use of the licensed wireless channels. The wireless base station communicates with user equipment via use of the granted licensed wireless channels. In one embodiment, the input from the wireless base station is based on detected interference of the user equipment receiving communications from the wireless base station over the licensed wireless channels.

As previously discussed, in contrast to conventional techniques of defining a region of wireless coverage associated with a wireless base station, embodiments herein include producing the region of wireless coverage based on user equipment feedback. Determining regions of wireless coverage using input from wireless base stations is useful because it provides a more accurate depiction of a region used by a respective wireless base station. After identifying a region of wireless coverage (based on actual use of the wireless channels) as indicated by the user equipment and/or wireless base station, the communication management resource then controls allocation of licensed and unlicensed wireless channels in the network environment. The controlled allocation of the unlicensed and/or other licensed wireless channels in the vicinity of the determined region of wireless coverage reduces interference with respect to the wireless base station and corresponding supported user equipment.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein. Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, executable instructions, etc., that supports operations as discussed herein.

One embodiment includes a computer readable storage medium and/or system having instructions stored thereon to facilitate wireless communications in a network environment. The instructions, when executed by computer processor hardware, cause the computer processor hardware (such as one or more co-located or disparately processor devices) to: identify a location of a wireless base station in a network environment; define a region of wireless coverage provided by the wireless base station based on input received from the wireless base station; and control allocation of wireless bandwidth in a vicinity of the region of wireless coverage, the controlled allocation protecting use of wireless channels licensed to the wireless base station.

Another embodiment includes a computer readable storage medium and/or system having instructions stored thereon to facilitate continued wireless service to communication devices in a network environment. The instructions, when executed by computer processor hardware, cause the computer processor hardware (such as one or more co-located or disparately processor devices) to: monitor user equipment in communication with a wireless base station; receive feedback from the user equipment, the feedback indicating link quality between the user equipment and the wireless base station; define a region of wireless coverage provided by the wireless base station based on the feedback received from the user equipment; and control allocation of wireless bandwidth in a vicinity of the region of wireless coverage, the controlled allocation protecting use of wireless channels licensed to the wireless base station.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 2 is an example diagram illustrating channel allocation information and service provider information according to embodiments herein.

FIG. 7 is an example diagram illustrating updating of wireless base station data and corresponding regions of wireless coverage based on feedback from the wireless base stations according to embodiments herein.

Figure 1:
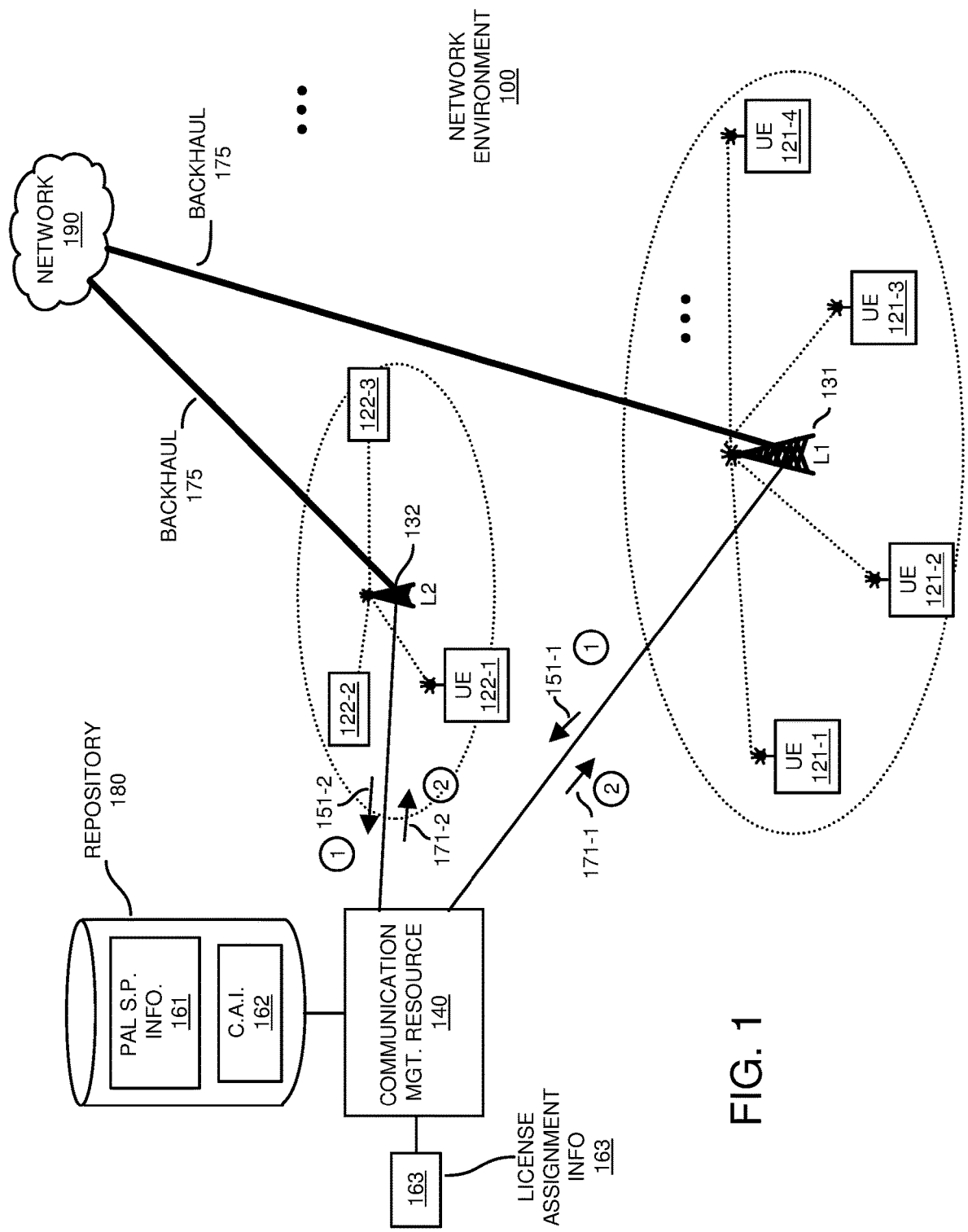
FIG. 1 is an example diagram illustrating a wireless network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Priority Access License (PAL) holders buy wireless licenses and reserve the right to use them in corresponding pre-determined geographical areas of operation. If there are PLA operators in the CBRS network, the main objection of SAS (Spectrum Access System) is to protect these PLA holders from the interference generated by other users in the network. However, since PAL holders (such as specific network operators) will provide multiple CBSDs (wireless base stations to serve corresponding user equipment). In one embodiment, each of the CBSDs will create a region to be protected from wireless interference so that a respective service provider is able to user equipment licensed wireless channels without experiencing a high level of wireless interference. This region is called PPA.

To provide so-called PAL protection, in accordance with general embodiments herein, a communication management resource in a wireless network environment tracks/records a location of a corresponding wireless base station. The communication management resource (or other suitable resource such as a wireless base station) then defines a region of wireless coverage provided by the wireless base station based on input received from the wireless base station. For example, in one embodiment, the input (indicating a region of wireless coverage provided by a wireless base station) is generated by the wireless base station and/or user equipment based upon wireless link performance metrics provided by user equipment in communication with the wireless base station. Subsequent to identifying the location of the wireless base station and defining the actual (measured) region of wireless coverage associated with the wireless base station, the communication management resource then controls subsequent allocation of wireless bandwidth in a vicinity of the region of wireless coverage to protect the wireless base station from wireless interference.

In contrast to merely using estimation techniques, embodiments herein include determining regions of wireless coverage first respective wireless base stations based at least in part on feedback from user equipment. Techniques as described herein are advantageous because performance metrics from user equipment and/or wireless base stations provide a basis in which to produce a more accurate depiction of the corresponding region of wireless coverage provided by a respective wireless base station.

Now, more specifically, FIG. 1 is an example diagram illustrating a wireless network environment according to embodiments herein.

As shown in this example embodiment, network environment 100 includes communication management resource 140 (such as a spectrum access system), wireless base station 131, user equipment 121-1, user equipment 121-2, user equipment 121-3, user equipment 121-4, wireless base station 132, user equipment 122-1, user equipment 122-2, user equipment 122-3, and network 190 such as the Internet.

Note that each of the resources (such as wireless base station 131, wireless base station 132, user equipment 121, user equipment 122, communication management resource 140, etc., in network environment 100 can be configured to include appropriate hardware, software, or combination of hardware and software to carry out respective operations as discussed herein.

In one embodiment, the communication management resource 140 is a so-called spectrum access system that allocates wireless channels for use by wireless devices (wireless base stations, user equipment, etc.) in the network environment 100.

As shown, the wireless base station 131 provides user equipment 121 (such as user equipment 121-1, user equipment 121-2, user equipment 121-3, user equipment 121-4) wireless access to the remote network 190 over backhaul 175. For example, in an upstream direction, user equipment 121-1 communicates data over a respective wireless communication link to the wireless base station 131; wireless base station 131 then conveys the data over the backhaul 175 to the network 190. In a downstream direction, the backhaul 175 conveys communications from the network 190 destined to the user equipment 121 over the backhaul 175 through the wireless base station 131 to respective target user equipment.

In a similar manner, the wireless base station 132 provides user equipment 122 (such as user equipment 122-1, user equipment 122-2, user equipment 122-3, etc.) wireless access to the remote network 190 over backhaul 175. For example, in an upstream direction, user equipment 122-1 communicates data over a respective wireless communication link to the wireless base station 132; wireless base station 132 conveys the data over the backhaul 175 to the network 190. In a downstream direction, the backhaul 175 conveys communications from the network 190 destined to the user equipment 121 over the backhaul 175 through the wireless base station 131 to respective target user equipment.

In accordance with further embodiments, the communication management resource 140 records a location of wireless base stations in the network environment 100.

In one embodiment, rather than merely estimating a region of wireless coverage provided by a wireless base station, the communication management resource 140 as described herein implements one or more techniques to more accurately define or determine a respective region of wireless coverage of each wireless base station so that wireless base stations are able to use licensed wireless channels without interference from other wireless users. The accurate definition of a respective region of wireless coverage associated with a first wireless base station as described herein ensures that other wireless base stations in a vicinity of the first wireless base station are able to use wireless channels without interference from the first wireless base station and vice versa.

As further shown, to manage wireless communications in the network environment 100, each of the wireless base stations registers with the communication management resource 140 (such as a spectrum access system). For example, in operation #1, via communications 151-1 from the wireless base station 131, the wireless base station 131 notifies the communication management resource 140 of its identity (unique network address=XXZ2) and current location (i.e., location L1). The location information conveyed in communications 151-1 can be conveyed in any suitable format (such as latitude and longitude if desired).

Further, via communications 152-1 from the wireless base station 132, the wireless base station 132 notifies the communication management resource 140 of its identity (unique network address=XXZ3) and current location (i.e., location L2). The location information conveyed in communications 152-1 can be conveyed in any suitable format (such as latitude and longitude if desired).

As an alternative to receiving the location information from the respective wireless base station, note that such information can be received from any suitable resource having knowledge of a location of the respective wireless base station.

FIG. 2 is an example diagram illustrating channel allocation information and service provider information according to embodiments herein.

As shown in FIG. 2, in response to receiving respective communications 151-1 and 151-2, the communication management resource 140 generates PAL (Priority Access License) service provider information 161-1 (stored in repository 180 in FIG. 1), which maps wireless base stations and corresponding identities to locations and corresponding service providers.

More specifically, as shown, the communication management resource 140 maps the wireless base station 131 having network address=XXZ2 to the location L1 and corresponding service provider #1; the communication management resource 140 maps the wireless base station 132 having network address=XXZ3 to the location L2 and corresponding service provider #1; the communication management resource 140 maps the wireless base station 133 having network address=ABX6 to the location L3 and corresponding service provider #2; and so on.

Accordingly, embodiments herein include recording the location of the wireless base stations based on received location information and, as further discussed below, providing a mapping between the location of the wireless base station and the wireless channels licensed to the wireless base station.

Further in this example embodiment, assume that both service provider #1 and service provider #2 are licensed (pay a fee) to use one or more available wireless channels in network environment 100.

In one embodiment, the available wireless channels assigned for use by the communication management resource 140 include wireless channels available in a CBRS (Citizens Band Radio System) frequency band. In such an instance, the communication management resource 140 allocates wireless channels from a CBRS band such as one or more Priority Access License (PAL) wireless channels, one or more General Authorized Access (GAA) wireless channels to different devices (such as wireless base stations 131, 132, or CBSDs) in network environment 100.

Referring again to FIG. 1, in accordance with further embodiments, the communication management resource 140 receives notification of the service provider identity and corresponding general region (such as via license information 163 in FIG. 1) in which each service provider pays fees for a license to use portions of the available wireless spectrum. Note that the license assignment information 163 can be received from any suitable resource having authority to provide such information to the communication management resource 140.

In addition to generating the PAL service provider information 161-1, the communication management resource 140 also creates channel allocation information 162-1 (stored in repository 180 in FIG. 1). As shown, the PAL service provider information 161-1 indicates a mapping of service providers and corresponding wireless channels licensed for use by the different service providers.

As further discussed herein, the communication management resource 140 ensures that the service providers licensing wireless channels in a respective wireless region (so-called PPA or PAL Protection Area) are free to use such channels in their regions of wireless coverage without interference by other wireless users in the network environment 100.

During or after registration of a respective wireless base station with the communication management resource 140 in operation #1, the communication management resource 140 notifies the respective wireless base station of one or more assigned wireless channels.

For example, in operation #2, via communications 171-1, and in accordance with license assignment information 163, the communication management resource 140 notifies the wireless base station 131 that wireless channels #11 and #12 are assigned for use by the wireless base station 131. Via communications 171-2, and in accordance with license assignment information 163 by the channel allocation information 162-1, the communication management resource 140 notifies the wireless base station 131 that wireless channels #11 and #12 are assigned for use by the wireless base station 132; and so on.

Thus, the allocation management resource 140 grants the wireless base stations use of the licensed wireless channels. The wireless base station communicates with user equipment via use of the granted licensed wireless channels.

In one embodiment, the communication management resource 140 allocates any type of wireless channels such as: one or more Priority Access Lease (PAL) wireless channels, General Authorized Access (GAA) wireless channels, or a combination of both.

In this example embodiment, the multiple wireless channels (#11, and #12) assigned by the communication management resource 140 for use by the wireless base station includes wireless channels available in a CBRS (Citizens Band Radio System) frequency band.

Note that the wireless base stations and corresponding user equipment operated in network environment 100 can be configured to communicate in accordance with any suitable wireless communication protocol. In one embodiment, the user equipment in network environment 100 communicates via the LTE (Long Term Evolution) protocol (5G protocol).

Based on the nature of CBRS channels, note that assignment/use of the SAS-allocated channels (such as PAL wireless channels, GAA wireless channels) can be revoked at any time by communication management resource 140 to enable use of the corresponding bandwidth (such as one or more wireless channels) by a higher priority incumbent user such as the government.

Although the communication management resource 140 has general knowledge of the location of each wireless base station 131, 132, etc., further embodiments herein include communicating with each of the wireless base stations to determine an accurate region of wireless coverage provided by each wireless base station as discussed below.

Figure 3:
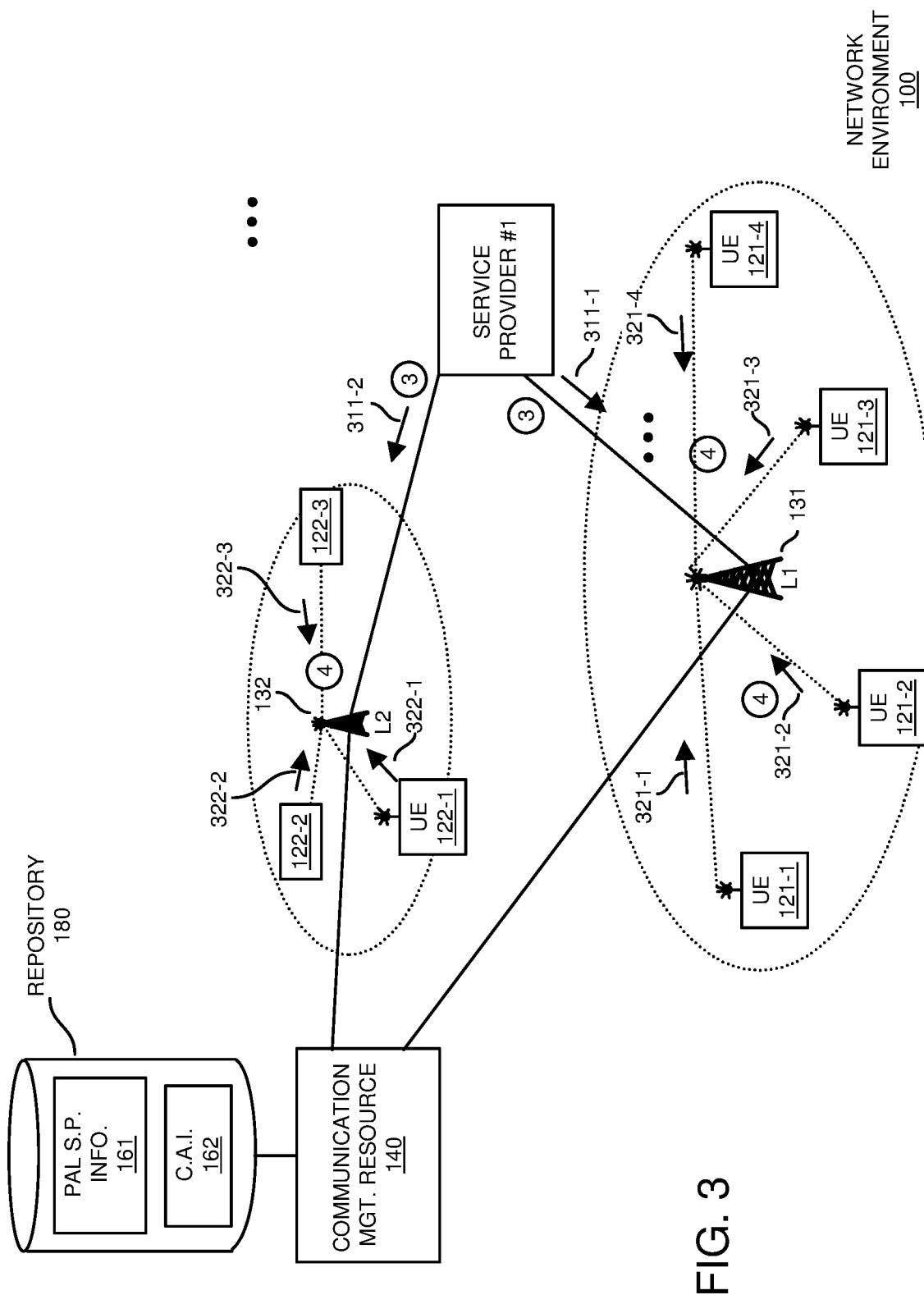
FIG. 3 is an example diagram illustrating collection of data from user equipment according to embodiments herein.

FIG. 3 is an example diagram illustrating wireless base station collection of data from user equipment according to embodiments herein.

As shown in FIG. 3, via operation #3, the service provider #1 provides each of its wireless base stations (such as wireless base station 321, wireless base station 322, etc.) threshold value information to facilitate accurate determination of a respective region of wireless coverage provided by a corresponding wireless base station.

More specifically, service provider #1 transmits communications 311-1 including threshold value information to wireless base station 131. Service provider #2 transmits communications 311-1 including threshold value information to wireless base station 131. Use of the threshold value information to identify boundaries of a respective wireless base station's region of wireless coverage is further discussed below.

Further in this example embodiment, each of the wireless base stations in network environment 100 receives feedback (such as communications 321, 322, etc.) from respective user equipment. The feedback from the user equipment to the wireless base station can include any suitable information.

For example, in one embodiment, the feedback from respective user equipment is or includes wireless link performance metrics generated by the user equipment. The link performance metrics indicate a quality associated with the respective wireless communication link between the user equipment and wireless base station.

More specifically, in this example embodiment, the user equipment 121-1 transmits communications 321-1 (such as link quality performance metrics produced by user equipment 121-1) to the wireless base station 131; the user equipment 121-2 transmits communications 321-2 (such as link quality performance metrics produced by user equipment 121-2) to the wireless base station 131; the user equipment 121-3 transmits communications 321-3 (such as link quality performance metrics produced by 121-3) to the wireless base station 131; the user equipment 121-4 transmits communications 321-4 (such as link quality performance metrics produced by user equipment 121-4) to the wireless base station 131, and so on.

Further, the user equipment 122-1 transmits communications 322-1 (such as link quality performance metrics produced by user equipment 122-1) to the wireless base station 132; the user equipment 122-2 transmits communications 322-2 (such as link quality performance metrics produced by user equipment 122-2) to the wireless base station 132; the user equipment 122-3 transmits communications 322-3 (such as link quality performance metrics produced by user equipment 122-3) to the wireless base station 132; and so on.

In one embodiment, the feedback in respective communications 321, 322 from each respective user equipment includes one or more metrics such as a CQI (Channel Quality Indicator) value, RSRP (Reference Signal Received Power) value, RSRQ (Reference Signal Received Quality) value, RSSI (Received Signal Strength Indicator) value.

The CQI (Channel Quality Indicator) value received from respective user equipment indicates a corresponding quality of the wireless communication link between the respective user equipment sending the CQI value and the wireless base station.

The RSRP (Reference Signal Received Power) value received from respective user equipment indicates is a measure of signal level and quality for modern LTE networks. In general, RSRP is a RSSI-type (received Signal Strength Indicator) of measurement, which indicates the power of the LTE Reference Signals spread over the full bandwidth and narrowband.

The RSRQ (Reference Signal Received Quality) value received from respective user equipment indicates a quality of a received reference signal. RSRQ measurement and calculation is based on RSRP and RSSI. RSRP determines signal quality and RSSI determines co-channel interference and noise.

Figure 4:
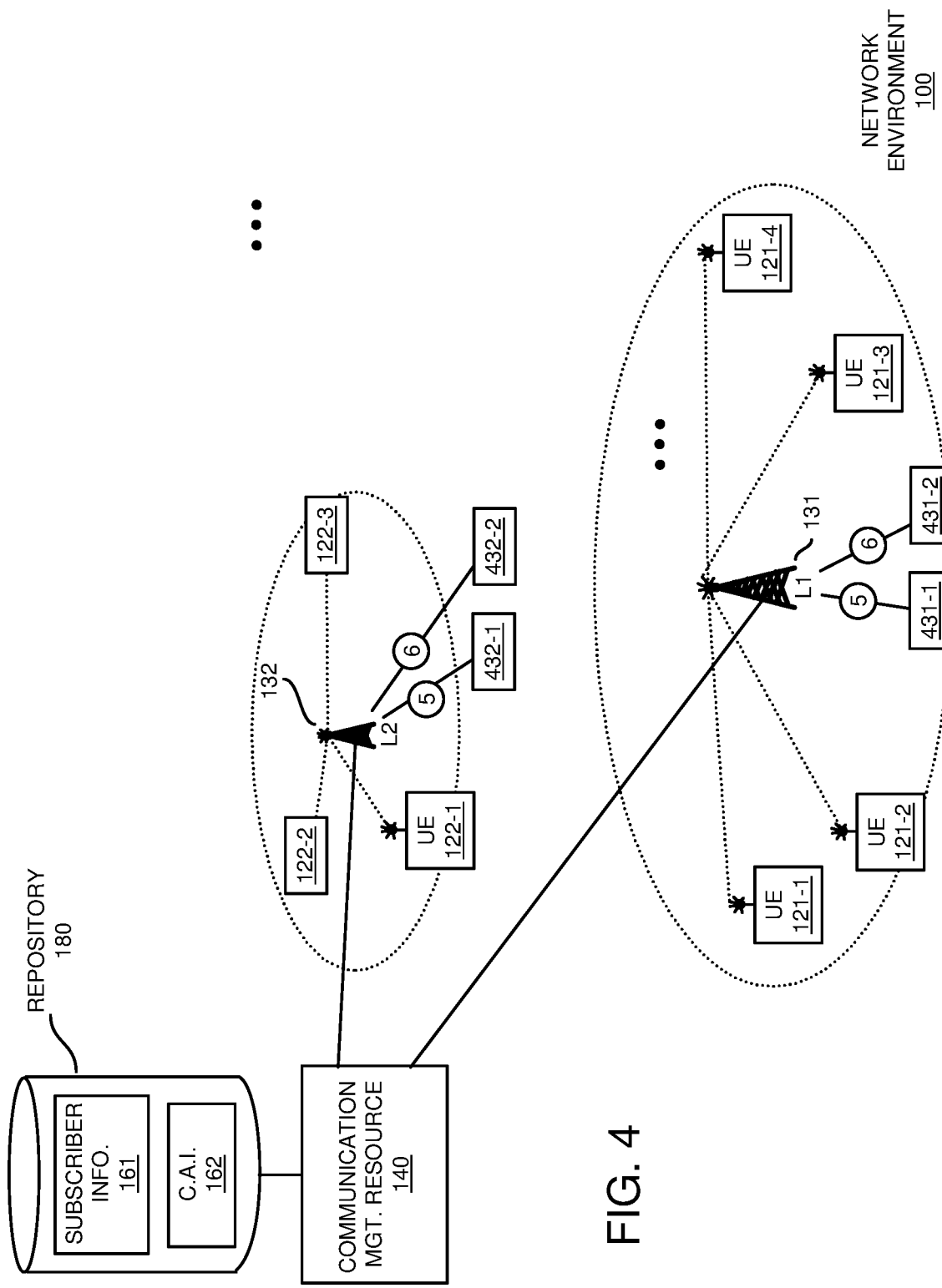
FIGS. 4 and 5 are example diagrams illustrating analysis of collected user equipment data and generation of interference scores for each of the different user equipment according to embodiments herein.

FIG. 4 is an example diagrams illustrating analysis of data and generation of interference scores for each of the different user equipment according to embodiments herein.

Via operation #5 in FIG. 4, each of the wireless base stations records feedback received from respective user equipment as well as other information (such as a MCS, TBS, user equipment buffer size, average data flow rate of wireless communications between the wireless base station and the user equipment, etc.) associated with the respective user equipment. Wireless base station 131 or other suitable resource records data 431-1. Wireless base station 132 records data 432-1. The MCS value (MCS) is a rough indicator (metric) of wireless bandwidth capability between the user equipment and wireless base station. The TBS value represents a Transport Block Size associated with wireless communications.

Via operation #6, the wireless base station or other suitable resource generates an interference score (431-2 and 432-2) for the respective user equipment.

Figure 5:
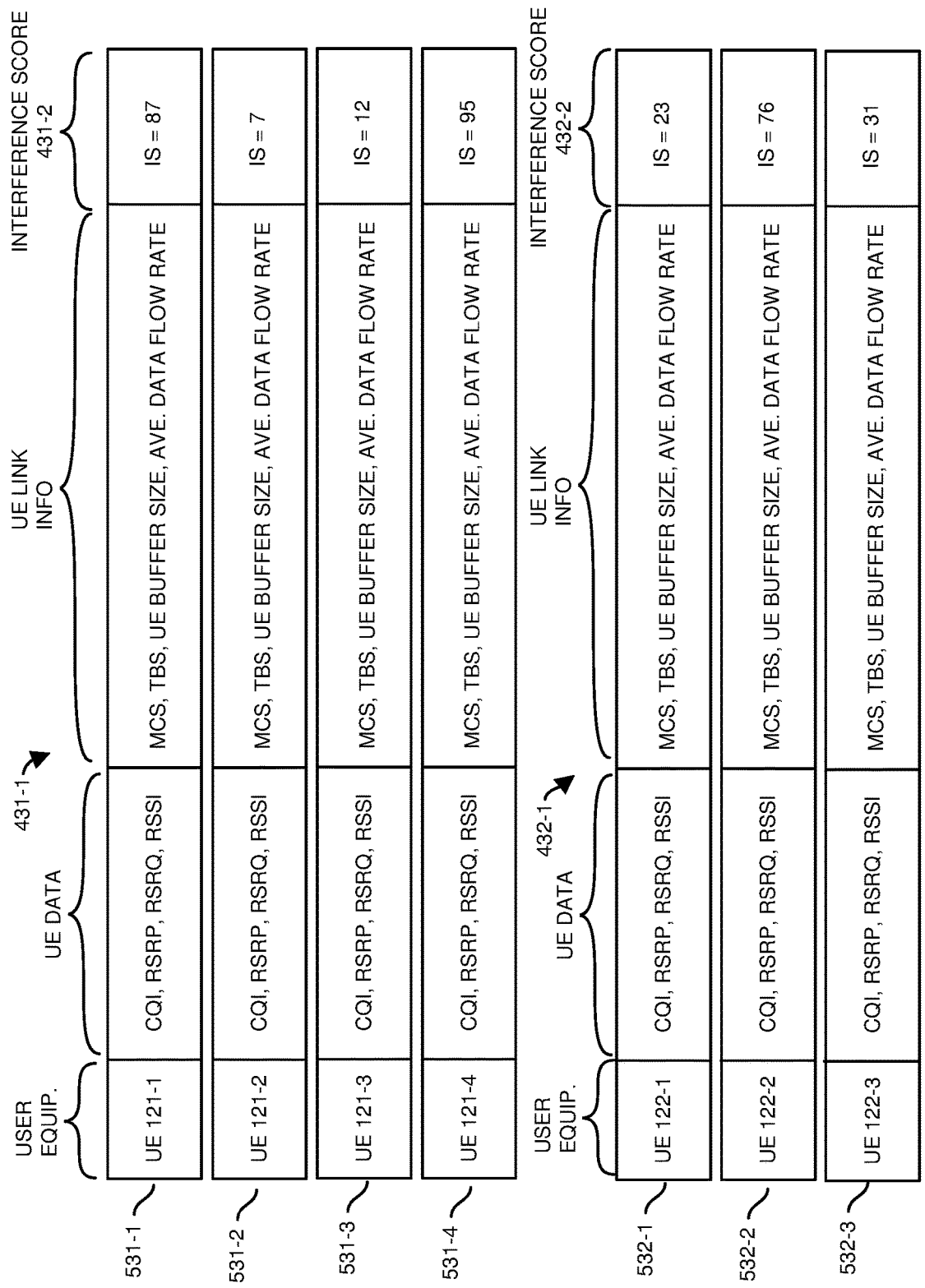

Results of wireless base station operations #5 and #6 are shown in FIG. 5.

FIG. 5 is an example diagram illustrating mapping of user equipment data, wireless link information, and corresponding interference scores associated with different user equipment different according to embodiments herein.

As shown in FIG. 5, the wireless base station 131 or other suitable resource records information associated with the different user equipment.

For example, the wireless base station 131 produces record 531-1 to include feedback (link quality metrics) generated by user equipment 121-1 such as CQI (Channel Quality Indicator) value, RSRP (Reference Signal Received Power) value, RSRQ (Reference Signal Received Quality) value, RSSI (Received Signal Strength Indicator) value.

In addition to storing such feedback (link quality metrics) from user equipment 121-1, the wireless base station 131 produces the record 531-1 to include additional information such as MCS, TBS, user equipment buffer size, average data flow rate, etc.

As previously discussed, the MCS value (MCS) is a rough indicator (metric) of wireless bandwidth capability between the respective user equipment and wireless base station. The TBS (Transport Block Size) value is a metric representing a Transport Block Size associated with wireless communications between the user equipment and the wireless base station 131.

As further discussed below, a processing resource (such as hardware or software) in the wireless base station or other suitable device produces an interference score based on the information in each record. In one embodiment, the interference score is a binary value such as either a high interference score or a low interference score. Alternatively, the interference score is a numerical value indicating a degree to which the respective user equipment experiences wireless interference.

Further in this example embodiment, via one or more of the settings associated with data stored in record 531-1, the wireless base station 131 (or other suitable processing hardware resource) generates an interference score of 87 (high interference) for the user equipment 121-1 and respective use of a licensed wireless channel used to communicate between the user equipment 121-1 and the communication management resource 140.

In this example embodiment, processing hardware such as in a respective wireless base station or other suitable resource generates interference score between 0 and 100, in which 100 indicates a highest amount wireless interference and 0 indicates a least amount of interference.

Assume that the wireless base station 131 calculates a wireless interference score of 87 (high interference) based on the data in record 531-1.

In a similar manner, the wireless base station 131 records collected information and generates a respective interference score value for each supported user equipment.

For example, the wireless base station 131 produces record 531-2 to include feedback (link quality metrics) generated by user equipment 121-2 such as CQI (Channel Quality Indicator) value, RSRP (Reference Signal Received Power) value, RSRQ (Reference Signal Received Quality) value, RSSI (Received Signal Strength Indicator) value.

In addition to storing such feedback from user equipment 121-2, the wireless base station 131 produces the record 531-2 to include additional information such as MCS, TBS, user equipment buffer size, average data flow rate, etc., associated with the user equipment 121-2.

As previously discussed, the MCS value (MCS) is a rough indicator (metric) of wireless bandwidth capability between the user equipment and wireless base station. The TBS value is a metric representing a Transport Block Size associated with wireless communications between the user equipment and the wireless base station 131.

Via one or more of the settings associated with user equipment data stored in record 531-2, the wireless base station 131 (or other suitable processing hardware resource) generates a wireless interference score of 7 (low interference) associated with the user equipment 121-2 and respective use of a licensed wireless channel allocated by the communication management resource 140.

The wireless base station 131 produces record 531-3 to include feedback (link quality metrics) generated by user equipment 121-3 such as CQI (Channel Quality Indicator) value, RSRP (Reference Signal Received Power) value, RSRQ (Reference Signal Received Quality) value, RSSI (Received Signal Strength Indicator) value.

In addition to storing such feedback from user equipment 121-3, the wireless base station 131 produces the record 531-3 to include additional information such as MCS, TBS, user equipment buffer size, average data flow rate, etc., associated with the user equipment 121-3. As previously discussed, the MCS value (MCS) is a rough indicator (metric) of wireless bandwidth capability between the user equipment and wireless base station. The TBS value is a metric representing a Transport Block Size associated with wireless communications between the user equipment 121-3 and the wireless base station 131.

Via one or more of the settings associated with user equipment data stored in record 531-3, the wireless base station 131 (or other suitable processing hardware resource) generates a wireless interference score of 12 (low interference) associated with the user equipment 121-3 and respective use of a licensed wireless channel allocated by the communication management resource 140.

The wireless base station 131 produces record 531-4 to include feedback (link quality metrics) generated by user equipment 121-4 such as CQI (Channel Quality Indicator) value, RSRP (Reference Signal Received Power) value, RSRQ (Reference Signal Received Quality) value, RSSI (Received Signal Strength Indicator) value.

In addition to storing such feedback from user equipment 121-4, the wireless base station 131 produces the record

531-4 to include additional information such as MCS, TBS, user equipment buffer size, average data flow rate, etc., associated with the user equipment 121-4. As previously discussed, the MCS value (MCS) is a rough indicator (metric) of wireless bandwidth capability between the user equipment and wireless base station. The TBS value is a metric representing a Transport Block Size associated with wireless communications between the user equipment and the wireless base station 131.

Via one or more of the settings associated with user equipment data stored in record 531-4, the wireless base station 131 (or other suitable processing hardware resource) generates a wireless interference score of 95 (high interference) associated with the user equipment 121-4 and respective use of a licensed wireless channel allocated by the communication management resource 140.

Further in this example embodiment, the wireless base station 132 (or other suitable processing hardware resource) produces records associated with each of the user equipment supported by the wireless base station 132.

For example, the wireless base station 132 produces record 532-1 to include feedback generated by user equipment 122-1 such as CQI (Channel Quality Indicator) value, RSRP (Reference Signal Received Power) value, RSRQ (Reference Signal Received Quality) value, RSSI (Received Signal Strength Indicator) value.

In addition to storing such feedback (link quality metrics) from user equipment 122-1, the wireless base station 132 produces the record 532-1 to include additional information such as MCS, TBS, user equipment buffer size, average data flow rate, etc., associated with the user equipment 122-1. As previously discussed, the MCS value (MCS) is a rough indicator (metric) of wireless bandwidth capability between the user equipment 122-1 and wireless base station 132. The TBS value is a metric representing a Transport Block Size associated with wireless communications between the user equipment and the wireless base station 132.

Via one or more of the settings associated with user equipment data stored in record 532-1, the wireless base station 132 (or other suitable processing hardware resource) generates a wireless interference score of 23 (a low interference level) associated with the user equipment 122-1 and respective use of a licensed wireless channel allocated by the communication management resource 140.

The wireless base station 132 produces record 532-2 to include feedback generated by user equipment 122-2 such as CQI (Channel Quality Indicator) value, RSRP (Reference Signal Received Power) value, RSRQ (Reference Signal Received Quality) value, RSSI (Received Signal Strength Indicator) value.

In addition to storing such feedback (such as link quality metrics) from user equipment 122-2, the wireless base station 132 produces the record 532-2 to include additional information such as MCS, TBS, user equipment buffer size, average data flow rate, etc., associated with the user equipment 122-2. As previously discussed, the MCS value (MCS) is a rough indicator (metric) of wireless bandwidth capability between the user equipment and wireless base station. The TBS value is a metric representing a Transport Block Size associated with wireless communications between the user equipment and the wireless base station 132.

Via one or more of the settings associated with user equipment data stored in record 532-2, the wireless base station 132 (or other suitable processing hardware resource) generates a wireless interference score of 76 (a fairly high interference level) associated with the user equipment 122-2 and respective use of a licensed wireless channel allocated by the communication management resource 140.

The wireless base station 132 produces record 532-3 to include feedback (link quality metrics) generated by user equipment 122-3 such as CQI (Channel Quality Indicator) value, RSRP (Reference Signal Received Power) value, RSRQ (Reference Signal Received Quality) value, RSSI (Received Signal Strength Indicator) value.

In addition to storing such feedback from user equipment 122-3, the wireless base station 132 produces the record 532-3 to include additional information such as MCS, TBS, user equipment buffer size, average data flow rate, etc., associated with the user equipment 122-3. As previously discussed, the MCS value (MCS) is a rough indicator (metric) of wireless bandwidth capability between the user equipment and wireless base station. The TBS value is a metric representing a Transport Block Size associated with wireless communications between the user equipment and the wireless base station 132.

Via one or more of the settings associated with user equipment data stored in record 532-3, the wireless base station 132 (or other suitable processing hardware resource) generates a wireless interference score of 31 (a fairly low interference level) associated with the user equipment 122-3 and respective use of a licensed wireless channel allocated by the communication management resource 140.

As previously discussed, note that further embodiments herein include assigning either a high interference level or a low interference level to the user equipment instead of a normalized number between 0 and 100.

For example, in accordance with further embodiments, based on the threshold information provided by a respective service provider, the wireless base station or other suitable resource can be configured to assign respective user equipment a high interference score if the corresponding RSRP from the user equipment is higher than a predetermined threshold (such as previously provided by the service provider #1), and if the RSRQ value provided by the user equipment is lower than a pre-determined threshold, AND average throughput, CQI, and TBS for the user equipment are lower than a pre-determined threshold, AND average UE data buffer size is greater than a pre-defined threshold.

In yet further embodiments, the wireless base station or other suitable resource assigns user equipment a low interference score if the RSRP value from the user equipment is equal or lower than a predetermined threshold, and if the RSRQ value from the user equipment is equal or higher than a pre-determined threshold, AND average throughput, CQI, and TBS are near average or higher than a pre-determined threshold, AND average UE data buffer size is greater than a pre-defined threshold.

Based on such embodiments, as shown in FIG. 5, the interference score (87) assigned to user equipment 121-1 indicates a high level of interference; the interference score (7) assigned to user equipment 121-2 indicates a low level of interference; the interference score (12) assigned to user equipment 121-3 indicates a low level of interference; the interference score (95) assigned to user equipment 121-4 indicates a high level of interference.

The interference score (23) assigned to user equipment 122-1 indicates a low level of interference; the interference score (76) assigned to user equipment 122-2 indicates a high level of interference; the interference score (31) assigned to user equipment 122-3 indicates a low level of interference.

Figure 6:
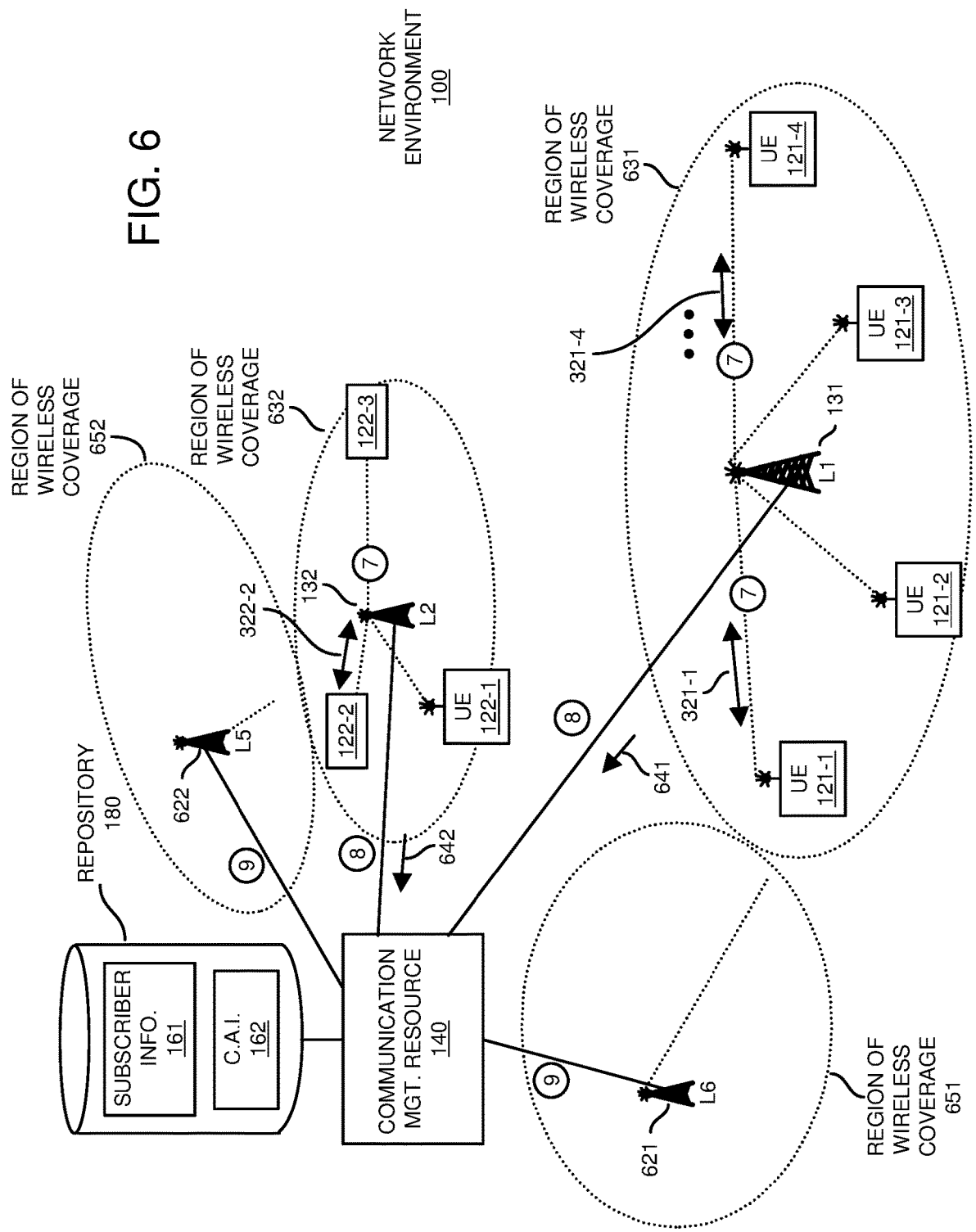
FIG. 6 is an example diagram illustrating determination of a region of wireless coverage for each of multiple wireless base stations (based on user equipment feedback) and reporting of same to a communication management resource according to embodiments herein.

FIG. 6 is an example diagram illustrating determination of a region of wireless coverage for each of multiple wireless base stations and reporting of same to a communication management resource according to embodiments herein.

As previously discussed, certain user equipment in network environment 100 experiences high levels of interference. Because such devices are entitled to protected use of the licensed wireless channels (such as #11 and #12), the wireless base station or other suitable resource initiates a respective test to determine the actual region of wireless coverage associated with a respective wireless base station.

For example, in operation #7, each wireless base station (such as CBSD) calculates the number of high interference user equipment and low interference user equipment supported by the wireless base station.

For user equipment experiencing a high amount of interference (such as user equipment 121-1, 121-4, and user equipment 122-2), the respective wireless base station calculates or estimates the distance based on any suitable distance measurement test such as via sounding reference signals reported by the respective user equipment 121-1, 121-4, and 122-2 experiencing high interference.

In one embodiment, a Sounding Reference Signal (SRS) is a reference signal transmitted by the user equipment in the uplink direction which is used by the wireless base station 131 (such as an eNodeB) to estimate the uplink channel quality over a wider bandwidth. The wireless base station 131 (such as eNodeB) may use this information for uplink frequency selective scheduling.

As an alternative to use of Sounding Reference Signal to determine distance metrics, any other technique of determining a location (such as based on Global Position System information) of the user equipment with respect to the wireless base station can be used as well to determine the region of wireless coverage.

More specifically, the communication management resource 140 has knowledge and control of other communication devices in network environment 100 operating in the CBRS band. For any user equipment (such as user equipment 121-1, 121-4, and 122-2) identified as experiencing high interference levels in the allocated wireless channels #11 and #12, it is assumed that communication devices (such as wireless base stations, user equipment, etc., associated with a service provider #3) in close proximity to the region of wireless coverage 631 and 632 cause interference to service provider #1 and corresponding communication devices assigned use of wireless channels #11 and #12.

To determine a region of wireless coverage with respect to location L1, via communications 321-1 between the wireless base station 131 and the user equipment 121-1, the wireless base station 131 detects a distance between the wireless base station 131 and the user equipment 121-1; via communications 321-4 between the wireless base station 131 and the user equipment 121-4, the wireless base station 131 detects a distance between the wireless base station 131 and the user equipment 121-4; via communications 322-2 between the wireless base station 132 and the user equipment 122-2, the wireless base station 132 (or other suitable resource) detects a distance between the wireless base station 132 and the user equipment 122-2.

In one embodiment, the detected distance represents a radius (or adjusted radius) of wireless coverage with respect to the corresponding wireless base station. The radius is used to indicate the region of wireless coverage associated with each wireless base station.

In accordance with further embodiments, the wireless base station 131 can be configured to add a delta value (buffer value) to the calculated path loss and report the distance value (or adjusted distance value, radius #1) associated with the region of wireless coverage 631 to the communication management resource 140 (such as a spectrum access system). In a similar manner as previously discussed, the wireless base station 132 can be configured to add a delta value (buffer value) to the calculated path loss and report the distance value (or adjusted distance value) associated with the region of wireless coverage 632 to the communication management resource 140 (such as a spectrum access system). In other words, the calculated distance metric (radius) can be adjusted to a larger value to define the region of wireless coverage to reduce a possibility of interference.

Via communications 641, the wireless base station 131 notifies the communication management resource 140 of the actual detected region of wireless coverage 631 associated with the wireless base station 131 and corresponding user equipment.

In response to receiving communications 641 such as information indicating the metes and bounds associated with region of wireless coverage 631 as determined by the wireless base station 131 (or other suitable resource), the communication management resource 140 updates the PAL service provider information 161-2 as shown in FIG. 7 to indicate the accurately generated region of wireless coverage 631 (such as radius #1 with respect to the location L1) associated with the wireless base station 131.

Via communications 642, the wireless base station 132 notifies the communication management resource 140 of the actual region of wireless coverage 632 (such as radius #2 with respect to the location L2) associated with the wireless base station 132.

In response to receiving communications 642 such as information indicating the metes and bounds associated with region of wireless coverage 632 as determined by the wireless base station 132 or other suitable resource, the communication management resource 140 updates the PAL service provider information 161-2 in FIG. 7 to indicate the region of wireless coverage 632 (such as radius #2 with respect to location L2) associated with the wireless base station 132.

FIG. 7 is an example diagram illustrating updated wireless base station data and corresponding regions of wireless coverage based on feedback from the wireless base stations according to embodiments herein.

As further shown in FIG. 7, and as previously discussed, the communication management resource 140 records the determined/updated region of wireless coverage associated with each wireless base station. For example, the communication management resource 140 updates the PAL service provider information 161-2 to indicate the actual region of wireless coverage 631 (such as radius #1 with respect to location L1) and the actual region of wireless coverage 632 (such as radius #2 with respect to location L2).

Referring again to FIG. 6, in operation #8 the communication management resource 140 receives notification of the regions of wireless coverage as well as that the user equipment 121-1, 121-4, and 122-2 experiences high amounts of interference. Thus, the communication management resource 140 is aware that it needs to lower the power levels of any 3rd party communication devices operated in a vicinity of the calculated region of wireless coverage 631 and 632 to prevent interference to corresponding licensed users/service provider #1.

In other words, as further discussed below, because the communication management resource 140 is now aware of the actual regions of wireless coverage 631 and 632 associated with the wireless base stations 131 and 132, the communication management resource 140 prevents granting of or power levels associated with wireless channels at or around the wireless frequency associated with wireless channel #11 and #12 in a vicinity of the regions of wireless coverage 631 and 632. If needed, in operation #9, the communication management resource 140 can be configured to lower power levels of the nearby communication devices (such as wireless base station 621 and wireless base station 622 or corresponding user equipment) causing the interference to the user equipment 121-1, user equipment 121-4, and user equipment 122-2 protected by a corresponding PAL license.

As previously discussed, generation of the boundaries associated with regions of wireless coverage as described herein provides a more accurate geographical region (zone) in which corresponding PAL entities (such as wireless base station 131, user equipment 121, wireless base station 132, user equipment 122) are entitled to protection against wireless interference by other wireless users.

Thus, subsequent to defining the location and respective region of wireless coverage associated with each wireless base station, in operation #9, the communication management resource then controls allocation of wireless bandwidth (such as licensed PAL wireless channels or unlicensed GAA wireless channels) such as to wireless base station 621 at location L6, wireless base station 622 at location L5, etc., in a vicinity of the region of wireless coverage to prevent interference with wireless channels used by wireless base station 131, wireless base station 132, etc. This controlled allocation of bandwidth by the communication management resource 140 in the vicinity of the regions of wireless coverage 631 and 632 provided by the wireless base station protects use of wireless channels licensed to a respective service provider operating the wireless base stations 131 and 132.

Figure 8:
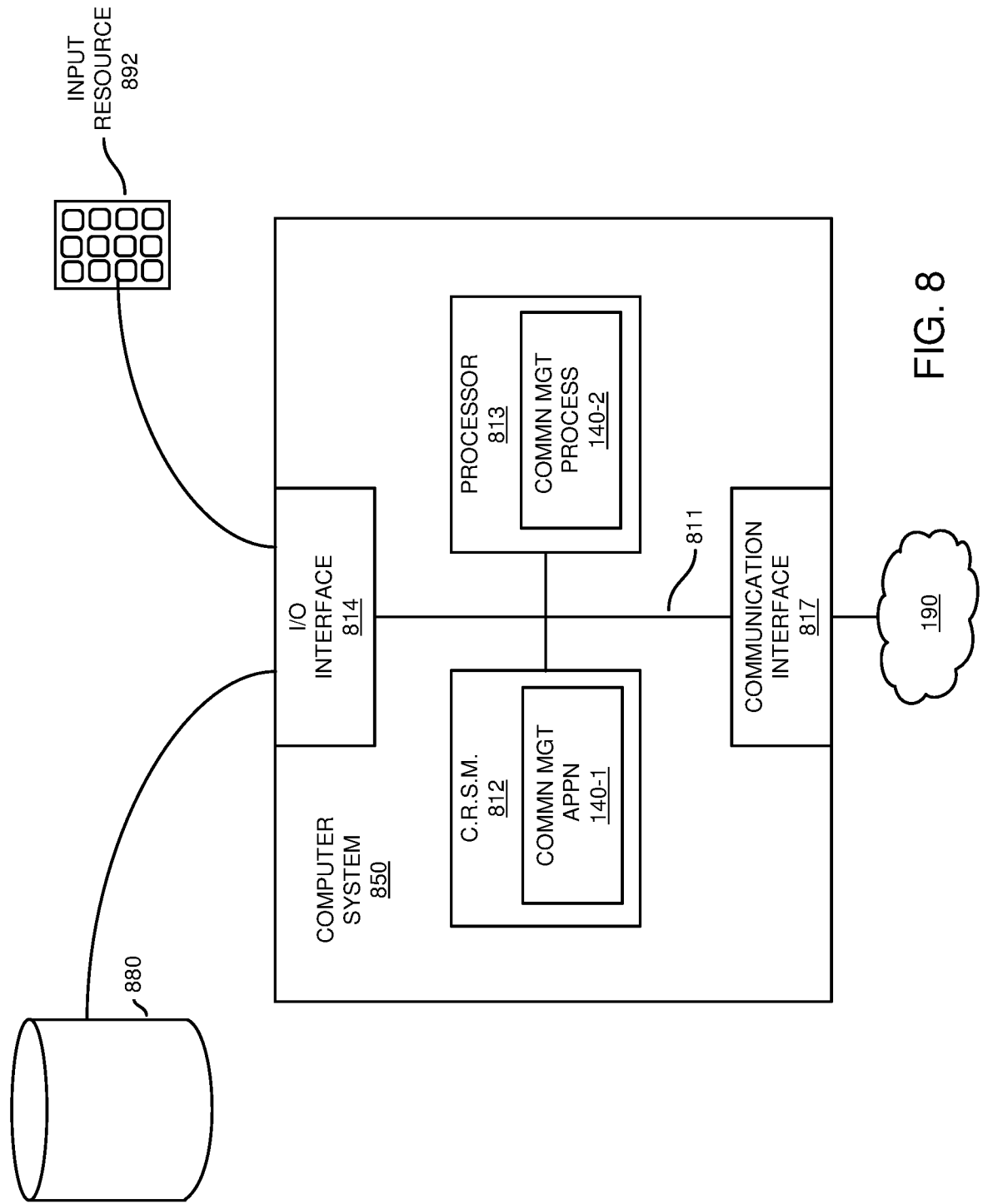
FIG. 8 is a diagram illustrating example computer architecture to execute one or more operations according to embodiments herein.

FIG. 8 is an example block diagram of a computer system for implementing any of the operations as previously discussed according to embodiments herein.

Any of the resources (such as communication management resource 140, wireless base station 131, user equipment 121-1, user equipment 121-2, etc., wireless base station 132, user equipment 122-1, user equipment 122-2, etc.) as discussed herein can be configured to include computer processor hardware and/or corresponding executable instructions to carry out the different operations as discussed herein.

As shown, computer system 850 of the present example includes an interconnect 811 that couples computer readable storage media 812 such as a non-transitory type of media (which can be any suitable type of hardware storage medium in which digital information can be stored and retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with communication management application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in management application 140-1 stored on computer readable storage medium 812. Execution of the communication management application 140-1 produces communication management process 140-2 to carry out any of the operations and/or processes as discussed herein.

Those skilled in the art will understand that the computer system 850 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 9-10. Note that the steps in the flowcharts below can be executed in any suitable order.

Figure 9:
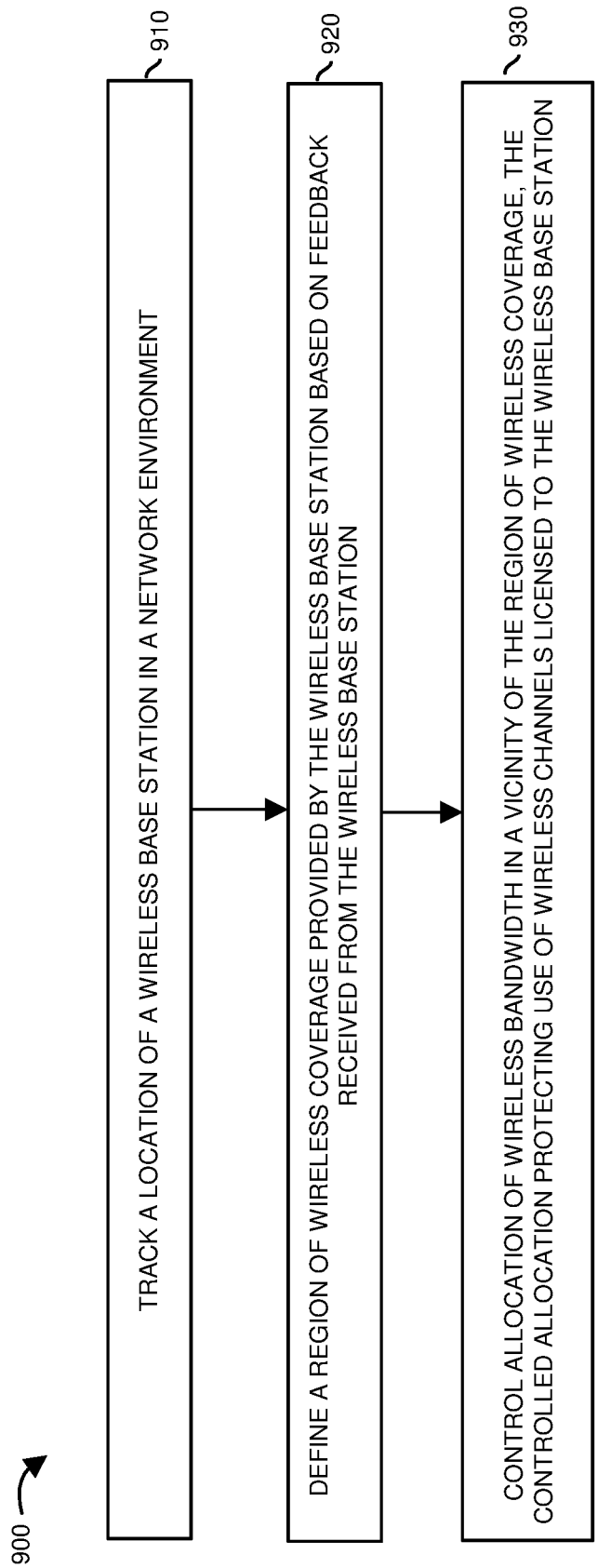
FIGS. 9-10 are example diagrams illustrating methods according to embodiments herein.

FIG. 9 is a flowchart 900 illustrating an example method according to embodiments. Note that there will be some overlap with respect to concepts as discussed above.

In processing operation 910, the communication management resource 140 tracks (records) a location L1 of wireless base station 131 in the network environment 100.

In processing operation 920, the communication management resource 140 defines a region of wireless coverage 631 provided by the wireless base station 131 based on feedback received from the wireless base station 631.

In processing operation 930, the communication management resource 140 controls allocation of wireless bandwidth (one or more wireless channels) in a vicinity of the region of wireless coverage 631. The controlled allocation protects use of wireless channels (such as wireless channels #11 and #12) licensed to the wireless base station 131 (service provider #1).

Figure 10:
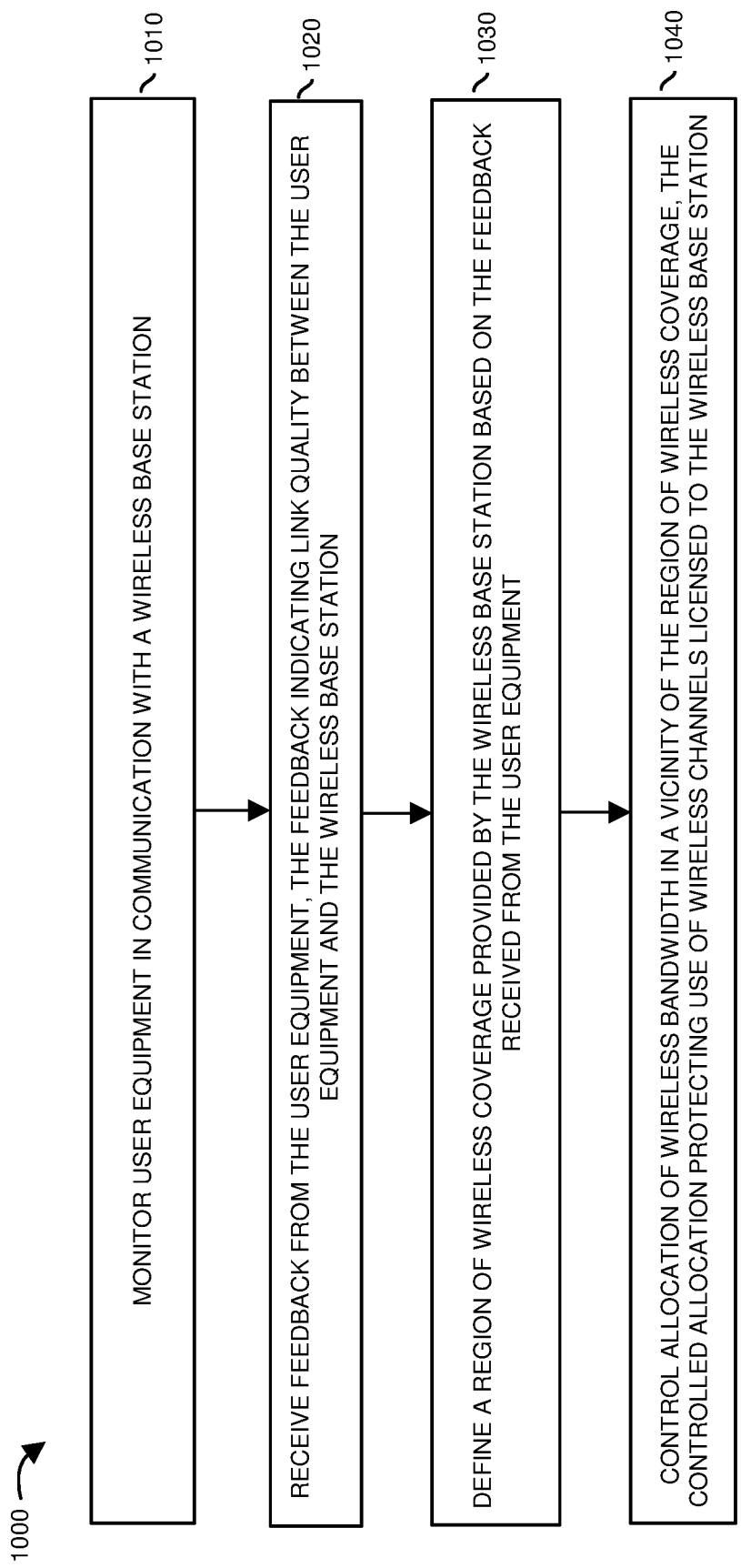

FIG. 10 is a flowchart 1000 illustrating an example method according to embodiments. Note that there will be some overlap with respect to concepts as discussed above.

In processing operation 1010, the wireless base station 121 monitors user equipment 121-1, 121-2, 121-3, 121-4 (collectively, user equipment 121) in communication with the wireless base station 131.

In processing operation 1020, the wireless base station 131 receives feedback (such as via respective communications 321-1, 321-2, 321-3, 321-4) from the respective user equipment 121. In one embodiment, the feedback (communications) indicates link quality between the user equipment 121 and the wireless base station 131.

In processing operation 1030, the communication management resource 140 defines a region of wireless coverage 631 with respect to location L1 provided by the wireless base station 131 based on the feedback received from the user equipment.

In processing operation 1040, the communication management resource 140 controls allocation of wireless bandwidth (such as one or more wireless PAL or GAA channels) in a vicinity (such as region of wireless coverage 651 and region of wireless coverage 652) of the region of wireless coverage 631. The controlled allocation in regions nearby region of wireless coverage 631 and region of wireless coverage 632 protects use of wireless channels #11 and #12 licensed to the wireless base station 131.

Note again that techniques herein are well suited to facilitate more accurate determination of a region of wireless coverage provided by a wireless base station and providing appropriate protection against wireless interference to corresponding wireless service providers in such regions. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
registering a first wireless base station with a communication management resource;
subsequent to the registering, receiving allocation of a wireless channel allocated for use by the first wireless base station; and
producing interference information indicating wireless interference experienced by the first wireless base station communicating with communication devices using the allocated wireless channel.

2. The method as in claim 1 further comprising:
communicating the interference information to the communication management resource.

3. The method as in claim 2, wherein the wireless channel is a first wireless channel; and
wherein the communication management resource controls wireless channel allocation to a second wireless base station in a vicinity of the first wireless base station based on the interference information.

4. The method as in claim 1 further comprising:
at the first wireless base station:
receiving threshold value information; and
utilizing the threshold value information to produce the interference information.

5. The method as in claim 4 further comprising:
producing the interference information based on feedback from each of the communication devices, the interference information indicating a region of wireless coverage provided by the first wireless base station.

6. The method as in claim 1, wherein the wireless channel is allocated from a CBRS (Citizen Band Radio Service) spectrum.

7. The method as in claim 1, wherein the interference information is based upon wireless link performance metrics provided by the communication devices in communication with the first wireless base station.

8. The method as in claim 1, wherein the interference information indicates a region of wireless coverage provided by the first wireless base station, the region of wireless coverage defined by a distance between the communication devices and the first wireless base station.

9. The method as in claim 1 further comprising:
communicating a location of the first wireless base station from the first wireless base station to the communication management resource.

10. The method as in claim 1, wherein the wireless channel allocated for use by the first wireless base station is a licensed wireless channel; and
wherein the communication management resource is operative to control allocation of a non-licensed wireless channel to a second wireless base station in a vicinity of the first wireless base station based on the wireless interference experienced by the first wireless base station communicating with the communication devices using the allocated wireless channel.

11. The method as in claim 1, wherein the first wireless base station provides the interference information to the communication management resource in response to the communication devices in communication with the first wireless base station detecting wireless interference associated with use of the wireless channel.

12. The method as in claim 1, wherein the allocated wireless channel is a wireless channel licensed to the first wireless base station.

13. A system comprising:
a first wireless base station operable to:
register a first wireless base station with a communication management resource;
subsequent to the registering, receive allocation of a wireless channel allocated for use by the first wireless base station; and
produce interference information indicating wireless interference experienced by the first wireless base station communicating with communication devices using the allocated wireless channel.

14. The system as in claim 13, wherein the first wireless base station is further operative to:
communicate the interference information to the communication management resource.

15. The system as in claim 14, wherein the allocated wireless channel is a first wireless channel; and
wherein the communication management resource controls allocation of a second wireless channel to a second wireless base station in a vicinity of the first wireless base station based on the interference information.

16. The system as in claim 13, wherein the first wireless base station is further operative to:
receive threshold value information; and
utilize the threshold value information to produce the interference information.

17. The system as in claim 16, wherein the first wireless base station is further operative to:
produce the interference information based on feedback from each of the communication devices.

18. The system as in claim 13, wherein the wireless channel is allocated from a CBRS (Citizen Band Radio Service) spectrum.

19. The system as in claim 13, wherein the interference information is based upon wireless link performance metrics provided by the communication devices in communication with the first wireless base station.

20. The system as in claim 13, wherein the interference information indicates a region of wireless coverage provided by the first wireless base station, the region of wireless coverage defined by a distance between the first wireless base station and the communication devices in wireless communication with the first wireless base station.

21. The system as in claim 13, wherein the first wireless base station is further operative to:
communicate a location of the first wireless base station from the first wireless base station to the communication management resource.

22. The system as in claim 13, wherein the wireless channel allocated for use by the first wireless base station is a licensed wireless channel; and
wherein the communication management resource is operative to control allocation of a non-licensed wireless channel to a second wireless base station in a vicinity of the first wireless base station based on the wireless interference experienced by the first wireless base station communicating with communication devices using the allocated wireless channel.

23. The method as in claim 13, wherein the first wireless base station provides the interference information to the communication management resource in response to the communication devices in communication with the first wireless base station detecting wireless interference.

24. The system as in claim 13, wherein the allocated wireless channel is a wireless channel licensed to the first wireless base station.

25. Computer-readable storage hardware having instructions stored thereon, the instructions, when carried out by computer processor hardware, cause the computer processor hardware to:
register a first wireless base station with a communication management resource;
subsequent to the registering, receive allocation of a wireless channel allocated for use by the first wireless base station; and
produce interference information indicating wireless interference experienced by the first wireless base station communicating with communication devices using the allocated wireless channel.

26. The method as in claim 1, wherein the wireless channel allocated for use by the first wireless base station is a licensed wireless channel.

27. The method as in claim 1, wherein the communication management resource is operative to control use of a non-licensed wireless channel to a second wireless base station in a vicinity of the first wireless base station based on the wireless interference experienced by the first wireless base station communicating with the communication devices using the allocated wireless channel.

28. The method as in claim 1, wherein the interference information indicates a region of wireless coverage based on interference of the communication devices receiving communications from the first wireless base station over the allocated wireless channel.

29. The method as in claim 1 further comprising:
producing the interference information in response to detecting that a first mobile communication device in communication with the first wireless base station detects the wireless interference.

30. The method as in claim 1, wherein the interference information causes the communication management resource to reduce a wireless power transmit level of a second wireless base station operated in a vicinity of the first wireless base station.

31. The method as in claim 30, wherein the reduced level of wireless power from the second wireless base station reduces interference to user equipment in communication with the first wireless base station.

* * * * *